United States Patent [19]

Ishimaru et al.

[11] Patent Number: 5,018,346
[45] Date of Patent: May 28, 1991

[54] MOWED GRASS CONTAINER FOR MOWING MACHINE

[75] Inventors: Takeshi Ishimaru; Satoshi Matsuke, both of Ehime, Japan

[73] Assignee: Iseki & Co., Ltd., Matsuyama, Japan

[21] Appl. No.: 523,350

[22] Filed: May 14, 1990

[30] Foreign Application Priority Data

Jun. 30, 1989 [JP] Japan .................................. 1-170455
Nov. 22, 1989 [JP] Japan .................................. 1-304072

[51] Int. Cl.⁵ ..................... A01D 34/70; A01D 34/12; A01D 34/64
[52] U.S. Cl. ........................................ 56/202; 56/205; 56/206
[58] Field of Search .............. 56/202, 205, 206, 320.2, 56/16.6, DIG. 9

[56] References Cited

U.S. PATENT DOCUMENTS

| | | | |
|---|---|---|---|
| 3,668,846 | 6/1972 | Knight | 56/205 |
| 3,678,665 | 7/1972 | Stanke | 56/205 X |
| 3,753,340 | 8/1973 | Mathews | 56/205 X |
| 4,637,203 | 1/1987 | Fedeli | 56/202 |
| 4,736,575 | 4/1988 | Fedeli | 56/202 |
| 4,738,088 | 4/1988 | Klever et al. | 56/202 |
| 4,836,610 | 6/1989 | Doering et al. | 56/202 X |

Primary Examiner—Stephen J. Novosad
Attorney, Agent, or Firm—Arthur T. Fattibene; Paul A. Fattibene

[57] ABSTRACT

A mowed grass container for a mowing machine having a mower attached to a machine body through a hanging link mechanism for recovering mowed grass mowed by said mower to the mowed grass container attached to the machine body through conveying means comprising a shielding plate coupled to the machine body, an upper cover aligned in parallel above and below the side face of said shielding plate, and a lower mowed grass containing unit, said lower mowed grass containing unit being opened at the upper face thereof and at the face adjacent the shielding plate side. The grass container is detachably attached to said shielding plate through a pivot provided at position separated from said shielding plate so as to rotate about the pivot as a rotating center with the open face of the grass container being directed downwardly. Thus, when the mowed grass is recovered by the mowed grass container, the upper face of the mowed grass containing unit is opened, and the open portion of the grass container adjacent the shielding plate side is press-bonded or biased toward the shielding plate. Accordingly, the mowed grass can be recovered by the mowed grass containing unit.

8 Claims, 14 Drawing Sheets

MOWED GRASS CONTAINER FOR MOWING MACHINE

BACKGROUND OF THE INVENTION

1. Field of the Invention

This invention relates to a mowed grass container for a mowing machine such as a garden tractor, a lawn tractor, a ride mower, etc. and, more particularly, to a mowed grass container for a riding type mowing machine in which the mowed grass container can be opened and closed in a carried state and a mowed grass containing unit that is detachably attached to a shielding plate through a pivot.

2. Description of the Prior Art

Heretofore, in a mowed grass container for a mowing machine of this type, a columnar piece is vertically fixed to the rear portion of a lawn tractor body, and the center of a lateral piece of plainly U-shaped frame is fixed to the upper end of the columnar piece. The rear portion of the frame is opened to form a mowed grass containing bag supporting frame. On the other hand, the mowed grass containing bag is so constructed as to fix the upper edge of a cloth bag body to a rectangular frame, and to place the rectangular frame in the U-shaped piece. Grips are pivotally secured to the centers of the right and left sides of such rectangular frame, the grips being tilted forwardly when the rectangular frame of the mowed grass containing bag is placed on the upper face of the U-shaped piece, and tilted down to the front face of the columnar piece to be engaged. A rotatable cover is located on the upper face of the columnar piece.

Since the conventional mowed grass container is constructed merely to place the upper frame of the mowed grass containing bag on the supporting frame. When the mowed grass contained in the mowed grass containing bag is to be emptied the cover is rotated, opening the upper face of the mowed grass containing bag. Hands are required to be inserted from above into the bag to discharge the mowed grass by hands or the fixture of the containing bag is released by the grip to separate the bag from the supporting frame while holding the grip, and the bag overturned by hands to discharge the mowed grass.

In this case and particularly in the case of a riding type mowing machine, a driver must get off the machine body when the mowed grass is to be disposed resulting in a time loss and a complicated mowed grass abandoning operation.

SUMMARY OF THE INVENTION

Accordingly, an object of this invention is to provide a mowed grass container for a mowing machine in which mowed grass abandoning operation or discharge can be easily, rapidly and securely conducted while its driver is riding on the riding type mowing machine body whereby the functions of attaching and detaching a mowed grass containing bag may be attained. An improved upright assembly for a fork lift truck is disclosed in which a sliding resistance between an inner mast and an outer mast is minimized to smoothly vertically move the inner mast therein.

In order to achieve these and other objects, there is provided according to this invention a mowed grass container for a mowing machine having a mower attached to a machine body through a hanging link mechanism for recovering mowed grass mowed by said mower to the mowed grass container attached to the machine body through conveying means comprising a shielding plate coupled to the machine body, upper covers aligned in parallel above and below the side face of said shielding plate, and a lower mowed grass containing unit, said lower mowed grass containing unit being opened at the upper face thereof and the face of the shielding plate side, further detachably attached to said shielding plate through a pivot provided at position separated from said shielding plate and so attached as to rotate at the pivot as a rotating center at the open face of said machine body side being directed downwardly.

According to another aspect of the present invention, there is provided in the mowed grass container for a mowing machine according to the above first aspect, wherein said upper cover is opened at the face of said shielding plate side and lower face to be longitudinally foldable.

According to yet another aspect of the present invention, there is provided in the mowed grass container for a mowing machine according to the above first aspect, wherein said upper cover is fixed to a gate-shaped frame pivotally secured longitudinally rotatably.

According to a further aspect of the present invention, there is provided in the mowed grass container for a mowing machine according to the above first aspect, wherein said upper cover is composed in bellows.

According to still another aspect of the present invention, there is provided in the mowed grass container for a mowing machine according to the above first aspect, wherein a connector is provided at the upper frame of said mowed grass containing unit, and a holding member pivotally secured to an upper cover fame is connected to said connector.

According to still another aspect of the invention, there is provided in the mowed grass container for a mowing machine according to the above first aspect, wherein said holding member is of a handle for discharging mowed grass in said mowed grass containing unit and disposed at a distance to be contacted with a driver's hand.

With the arrangement of the mowed grass container for a mowing machine as specified in the above first aspect, when the mowed grass mowed by the mower is recovered by the mowed grass container, the upper face of the mowed grass containing unit is opened, and the open portion of the shielding plate side is press-bonded to the shielding plate. Accordingly, the mowed grass can be recovered to the mowed grass containing unit. More specifically, since the top of the mowed grass containing unit is detachably attached to the pivot provided at a position separated from the shielding plate, the open portion of the mowed grass containing unit to the shielding plate side is naturally press-bonded to the shielding plate by the weight of the mowed grass containing unit at the positional relationship of the containing unit to the shielding plate, and the press-bonded state is not accidentally opened even by the vibration of the machine body.

Further, since the mowed grass containing unit is detachably attached to the shielding plate through the pivot, when only the mowed grass containing unit is removed and the mowed grass in the mowed grass containing unit is disposed, the handle is provided at the pivot, the handle is held to direct the open face of the containing unit upward, thereby carrying the containing unit to the arbitrary position to be disposed to abandon the mowed grass without accidentally leaking the mowed grass.

In addition, since the mowed grass containing unit is so constructed as to rotate at the pivot as a rotating center to direct the open portion of the containing unit at the shielding plate side downwardly, when the holding piece is provided at the containing unit to hold the holding piece to rotate the piece, the containing unit is released in the shielding state by the shielding plate to direct the open portion of the shielding plate side downwardly. Thus, the mowed grass can be disposed, and when the holding piece is rotated reversibly, the open portion of the containing unit at the shielding plate side is again shielded by the shielding pate so that the upper face becomes open, thereby continuously recovering the mowed grass.

With the arrangement according to the second aspect of the invention, the upper cover is opened at the face of the shielding plate side and the lower face, but when the mowed grass is recovered by the mowed grass containing unit, the open face of the shielding plate side is brought into pressure contact with the shielding plate, and is hence fed to the container unit aligned under the open portion of the lower face. Further, since the upper cover is constructed to be longitudinally foldable, it can be folded arbitrarily in both forward and reverse directions to open the upper face of the containing unit, thereby easily attaching or detaching the lower mowed grass containing unit.

With the arrangement according to the third aspect of the invention, since the upper cover is fixed to the longitudinally rotatable gate-shaped frame, the upper cove can be easily opened or closed by the longitudinal rotating operation of the gate-shaped frame. In this case, since the gate-shaped frame can pivotally secure the handle, the upper cover can be opened or closed through the handle operation.

With the arrangement according to the fourth aspect of the invention, since the upper cover is formed of the bellows, the upper cover can be easily opened or closed, and since the upper cover is not of hard box, the upper cover is not opened to the vicinity of the driver's seat of the machine body over the shielding plate at the time of opening or closing the upper cover, but the upper cover can be always opened or closed outside the shielding plate.

With the arrangement according to the fifth aspect of the invention, since the connector is provided at the upper frame of the mowed grass containing unit and the holding member pivotally secured to the upper cover frame is connected to the connector, the member is connected to thereby rotate the containing unit to direct the open portion of the containing unit at the shielding plate side by rotating the member. In this case, the mowed grass recovered in the containing unit can be easily disposed, and when the member is reversibly rotated, the vacant containing unit can be returned to the original position to advance the next mowed grass recovering work.

With the arrangement according to the sixth aspect of the invention, since the holding member is a handle for discharging the mowed grass in the containing unit and disposed at a distance in contact with the driver's hand, the mowed grass in the containing unit can be discharged by holding the handle while the driver is sitting on the driver's seat and can return the containing unit after the mowed grass is completely discharged, thereby improving the operability.

These and other objects and features of the present invention will become apparent from the following detailed description in conjunction with the attached drawings.

DESCRIPTION OF THE PREFERRED EMBODIMENTS

An embodiment of the present invention will now be described in detail with reference to the accompanying drawings.

Figure 1:
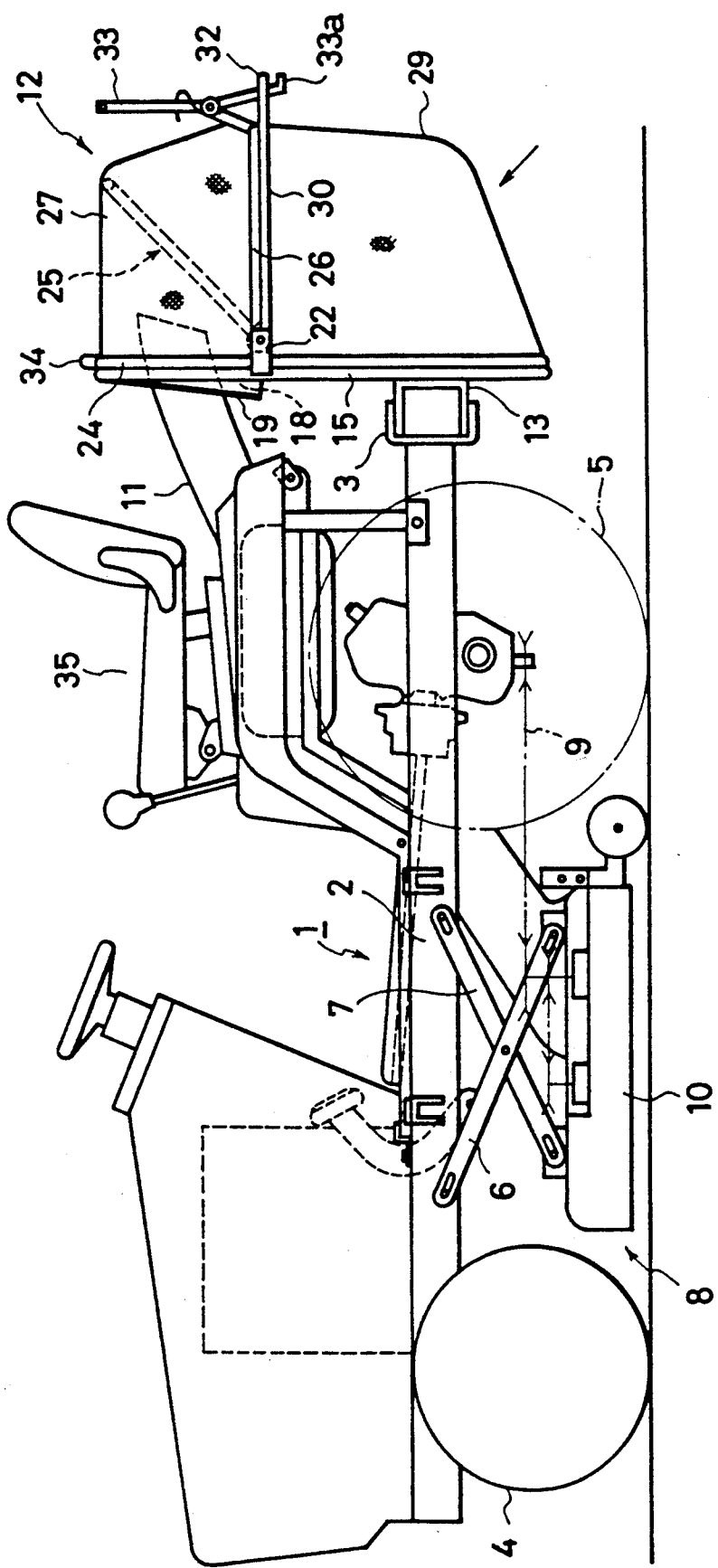
FIG. 1 is a side view of a whole lawn tractor coupled with an embodiment of a mowed grass container for a mowing machine according to the present invention.
Figure 2:
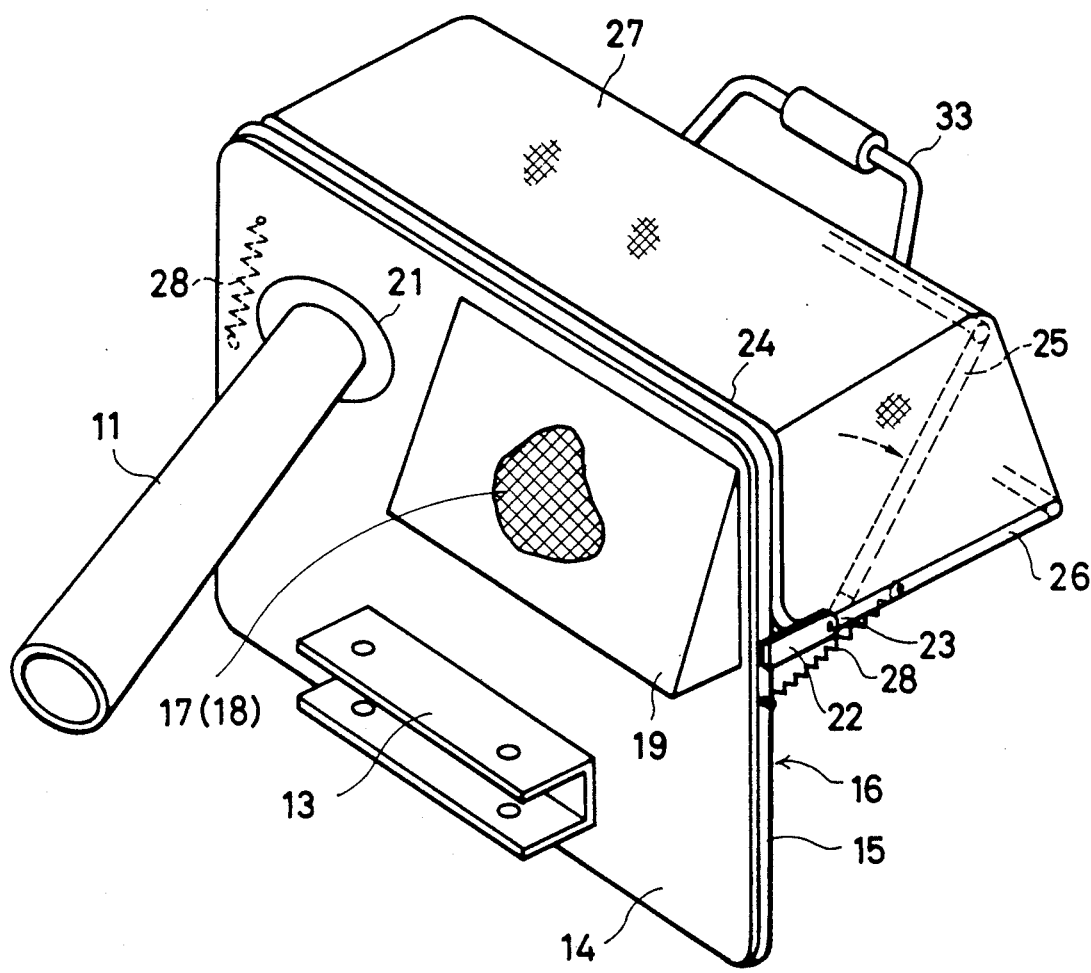
FIG. 2 is a perspective view showing the state that an upper cover is attached to a shielding plate.

In FIG. 1, reference numeral 1 denotes a lawn tractor. A coupling hitch 3 is provided at the rear side of the frame 2 of the lawn tractor 1. A mower 8 is vertically movably coupled to a body between front wheels 4, 4 and rear wheels 5, 5 through hanging links 6, 6 and 7, 7 to be drivably coupled through a bent transmission mechanism 9. A mowed grass discharging cylinder 11 is coupled to the right side discharge port (not shown) of a mower deck 10 of the mower 8, and its rear end is so attached as to recover the grass mowed by a rotary mowing cutter in the mower deck 10 into the mowed grass container 12 coupled to the coupling hitch 3. The mowed grass container 12 is detachably coupled to the coupling hitch 3 through a mount 13, which is in turn fixed to the vicinity of the lower end of a shielding plate 16 provided in front of the mowed grass container 12 substantially at the center thereof. The shielding plate 16 is composed by fixing a rectangular frame 15 bent from a pipe material to the peripheral surface of a rectangular iron plate 14. A dust discharger 18 in the form of an opening in the ion plate being long in a lateral direction closed by a metal gauze 17 is provided at the top of the iron plate 14. The front side and the right and left front sides of the dust discharger 18 are covered with dust discharge cover 19 protruding obliquely from the upper side to the lower side thereof to discharge dusts toward a downward direction. The mowed grass discharge cylinder 11, coupled to the discharge port (not shown) of the mower deck 10 at its right side, extends rearwardly through the outside of the right side rear wheel 4 and protrudes at its rear portion from a cylinder mount 21 provided on the iron plate 14 and into the mowed grass container 12. Supporting arms 22, 22 protrude from the lower sides of the dust discharger 18 and the cylinder mount 21 toward a rearward direction, as seen from the side, at the right and left sides of the longitudinal frame 15. Further, the supporting arms 22, 22 protrude in length x rearward of the rectangular frame 15, pivotal pins 23, 23 protrude inward to the vicinity of the ends of the arms 22, 22 to pivotally secure the ends of an upper gate-shaped frame 24, an intermediate gate-shaped frame 25 and a lower gate-shaped frame 26 bent from pipe materials to the pivotal pins 23, 23. The gate-shaped frames 24, 25, 26 are respectively fixed to the upper end, intermediate portion and lower end of a cover 27 composed by opening the front and lower ends of a cloth, vinyl sheet or bellows. The upper gate-shaped frame 24 is fixed to the end of the shielding plate 15 (front face) of the cover 27 to be contactable with the shielding plate 16, and the shielding plate 16 of the cove 27 is opened. The lower gate-shaped frame 26 is fixed to the open edge of the lower face of the cover 27 to accurately hold the lower face open state of the cover 27. The intermediate gate-shaped frame 25 is provided substantially at the intermediate portion between the upper gate-shaped frame 24 and the lower gate-shaped frame 26, and so fixed to the cover 27 as to hold the cover 27 substantially in a square shape as seen from its side. The gate-shaped frames 24, 25, 26 are rotated at approximately 90 degrees rearward of the shielding plate 16 at pivotal pins 23, 23 as rotating centers to open and close the cover 27 longitudinally.

Figure 3:
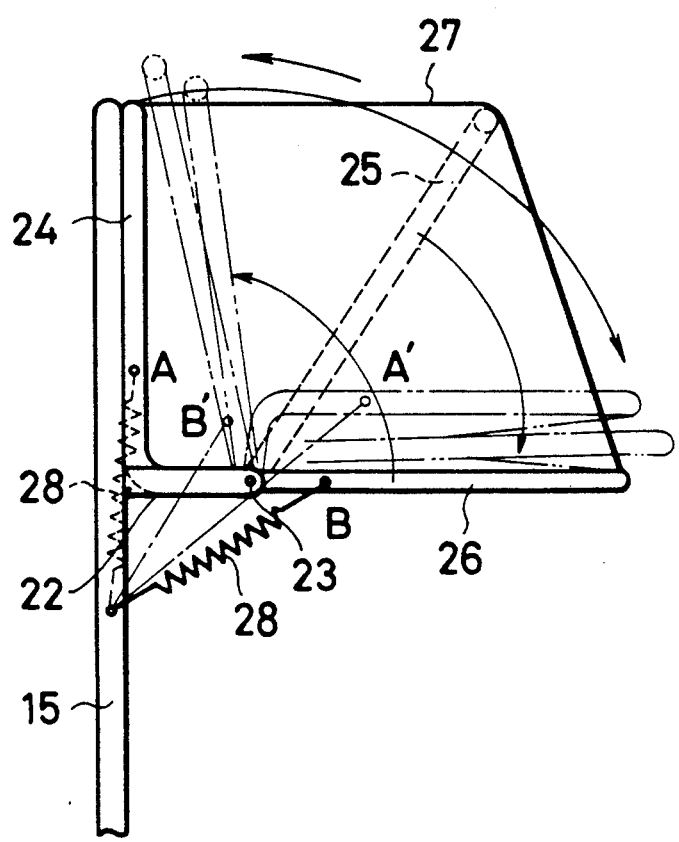
FIG. 3 is a fragmentary side view of FIG. 2.
Figure 4:
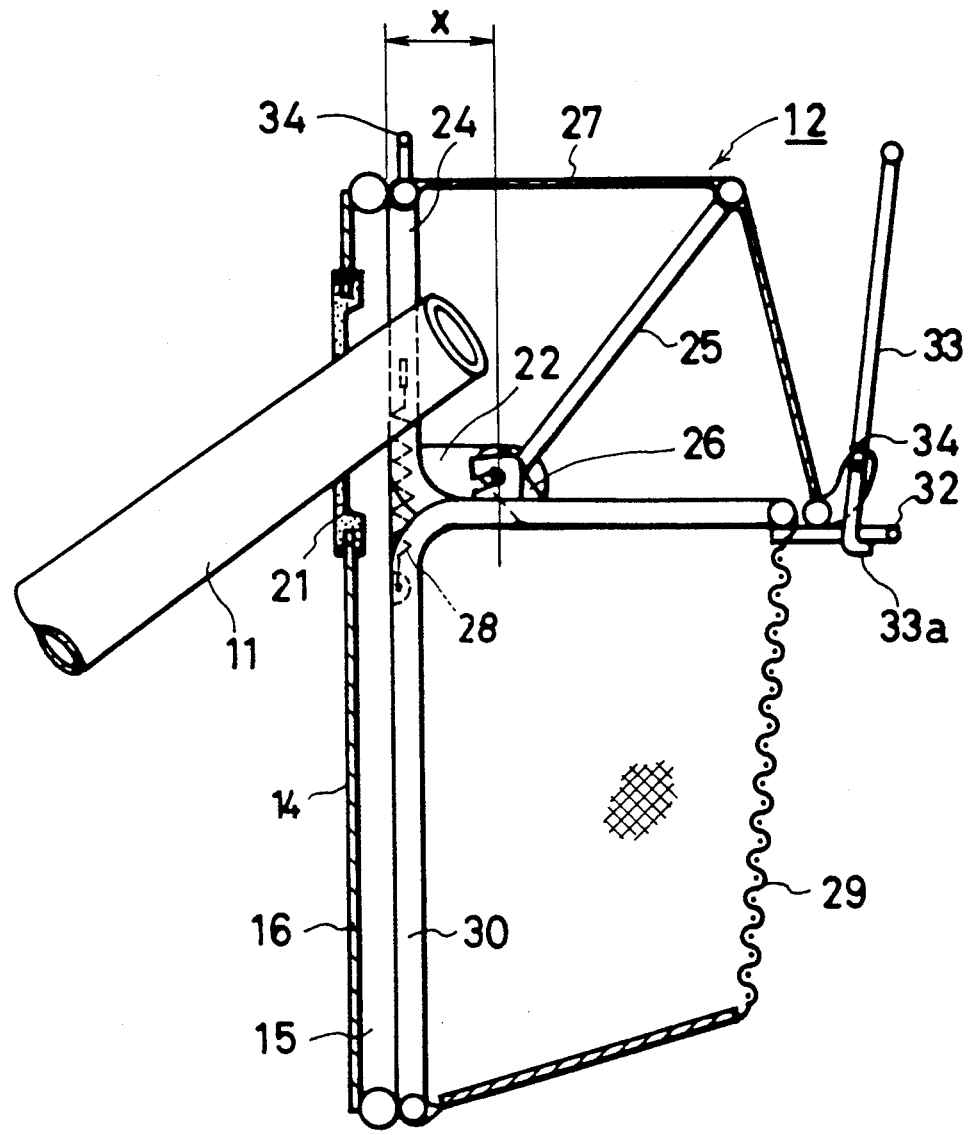
FIGS. 4 to 7 are longitudinal side sectional views showing the operating state of the whole mowed grass container of the embodiment.

As shown in FIG. 3, springs 28, 28 are interposed between the side face of the upper frame 24 and the side face of the lower frame 25, the side face of the rectangular frame 15 of the shielding plate 16, and the springs 28, 28 bias to pivotally rotate the upper and lower frames 24 and 26 at the pivotal pins 23 as fulcrum to the shielding plate 16 side and the rear horizontal position side to be fixed. The springs 28, 28 are so provided at opposite sides as not to collide each other.

Figure 8:
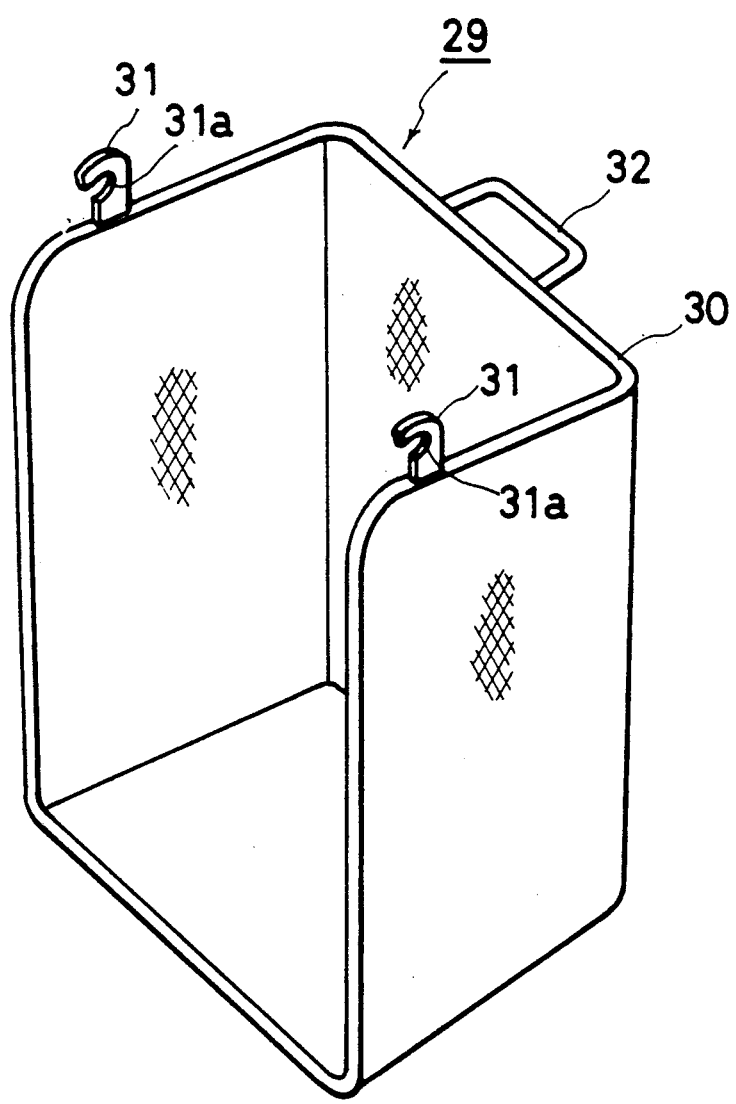
FIG. 8 is a perspective view of the mowed grass containing unit.
Figure 10:
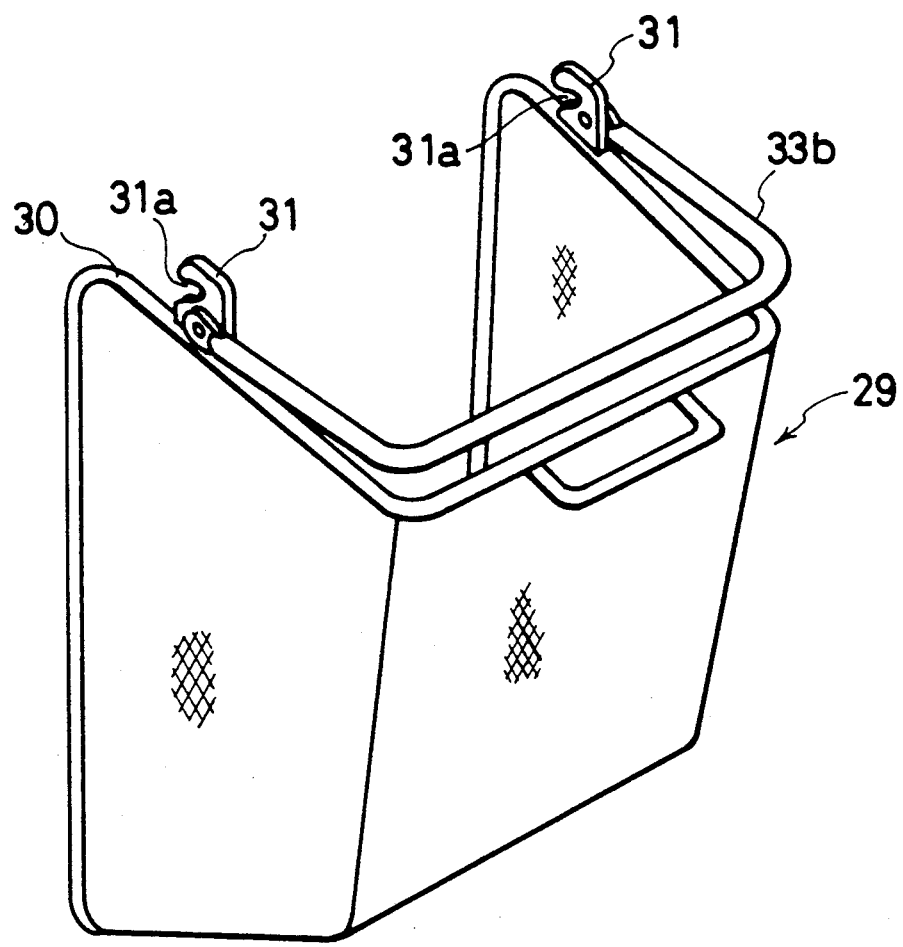
FIG. 10 is a perspective view showing another embodiment of a mowed grass container for a mowing machine according to the present invention.
Figures 11, 12:
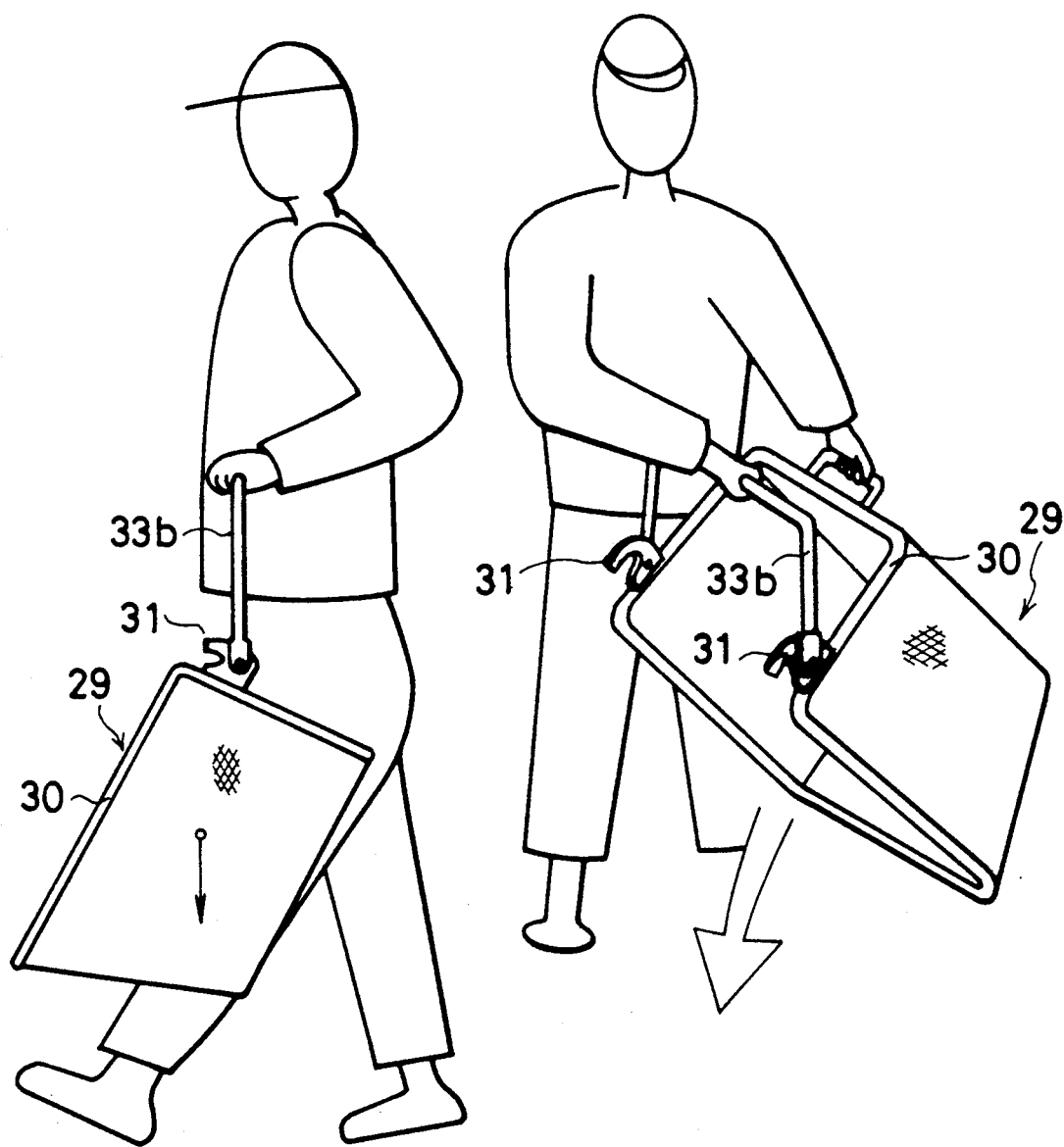
FIG. 11 is a side view showing the state that the mowed grass containing unit of FIG. 10 is carried.
FIG. 12 is a perspective view showing the discharged state of mowed grass.
Figure 13:
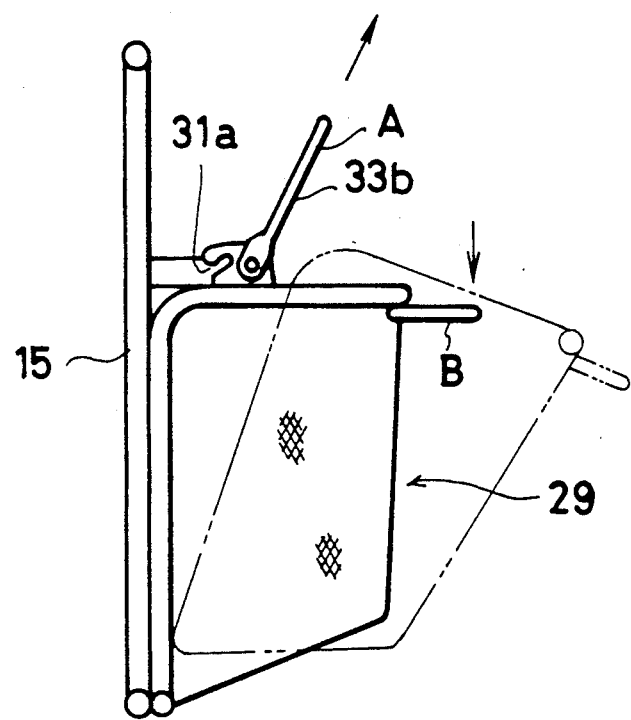
FIG. 13 is a side view showing the state that the mowed grass containing unit is attached to or removed from the shielding plate.

Then, FIG. 8 shows a mowed grass containing unit 29 in which its upper and front faces are opened in a square shape as seen from its side. Three faces except a bottom plate are composed of meshes but are not limited to the particular example. A frame 30 formed by bending a pipe material which is fixed to the open edge. When the open side of the front face is brought into contact with the back face of the shielding plate 16, hooks 31, 31 oppositely protrude at positions to be movably engaged with the pivotal pins 23, 23 at the upper front position of the frame 20, and cutouts 31a, 31a are so cut out from the front positions of the hooks 31, 31 as to insert or remove the pivotal pins 23, 23 from obliquely lower side. As shown in FIG. 10, a holder piece 33b may be formed between the hooks 31 and 31. In this case, as shown in FIGS. 11 and 12, the mowed grass containing unit can be directed at the open side upward by means of its center of gravity by holding the holder piece. Thus, the mowed grass in the mowed grass containing unit 29 can be carried to an arbitrary place without accidentally leaking the grass and disposed as shown in FIG. 12.

Since the cutouts 31a, 31a formed at the hooks 31, 31 are cut out from obliquely lower side of the front faces of the hooks 31, 31 upwardly, even if the mowed grass containing unit 29 is rotated at the pivotal pins 23, 23 as rotating centers when the pivotal pins 23, 23 are movably engaged, the pivotal fulcra are not deviated by means of the weight of the mowed grass containing unit 29.

Figure 9:
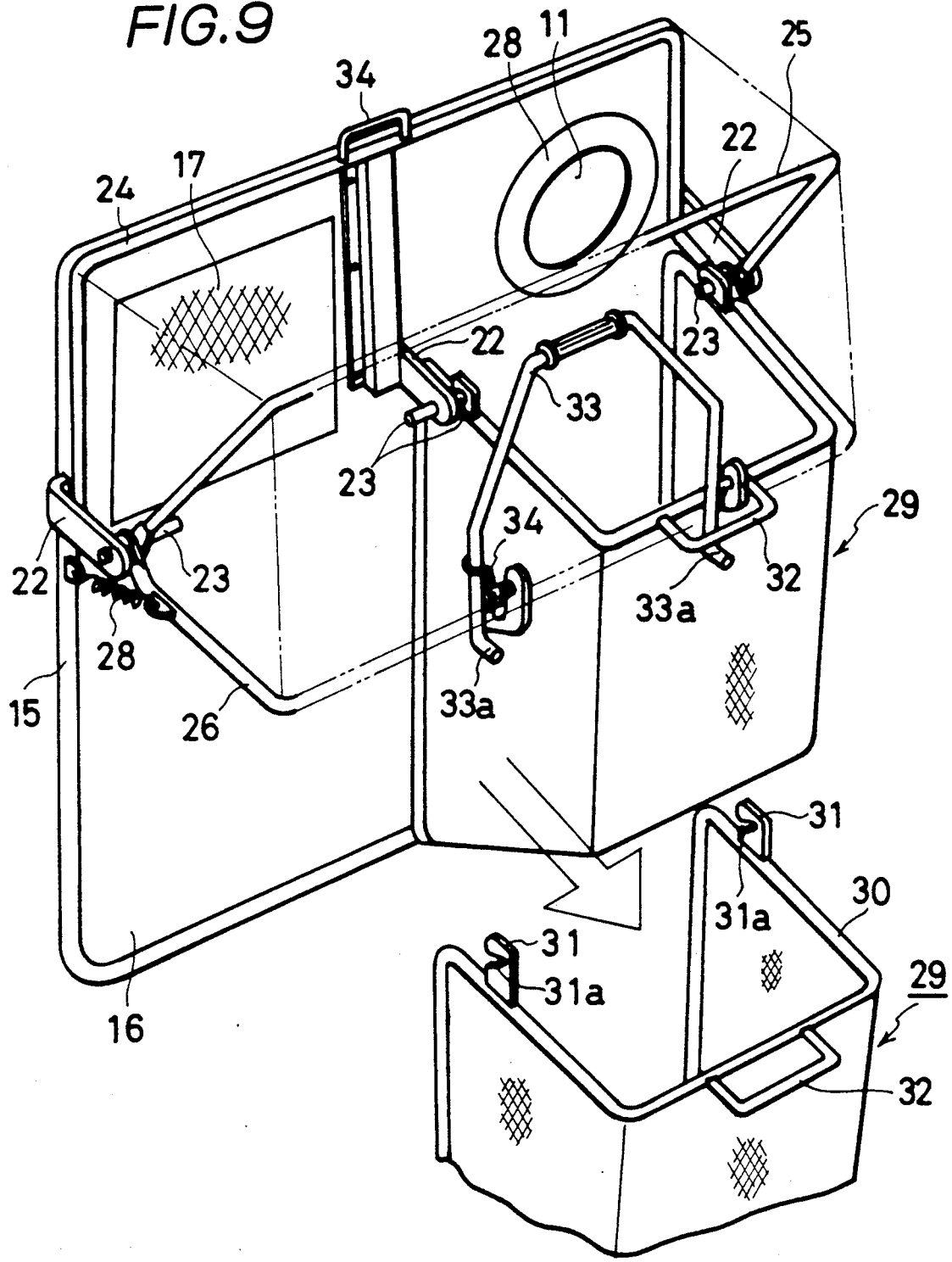
FIG. 9 is a perspective view for explaining from the back side of the mowed grass container.

In FIG. 9, mowed grass containing units 29 are respectively aligned at right and left sides, and covered at the tops with top covers. In this case, pivotal pins 23, 23 protrude from both side faces of a supporting arm 22 protruding at the center of the outer face of the shielding plate 16 to pivotally secure the mowed grass containing units 29 and 29 at the right and left sides.

Figure 7:
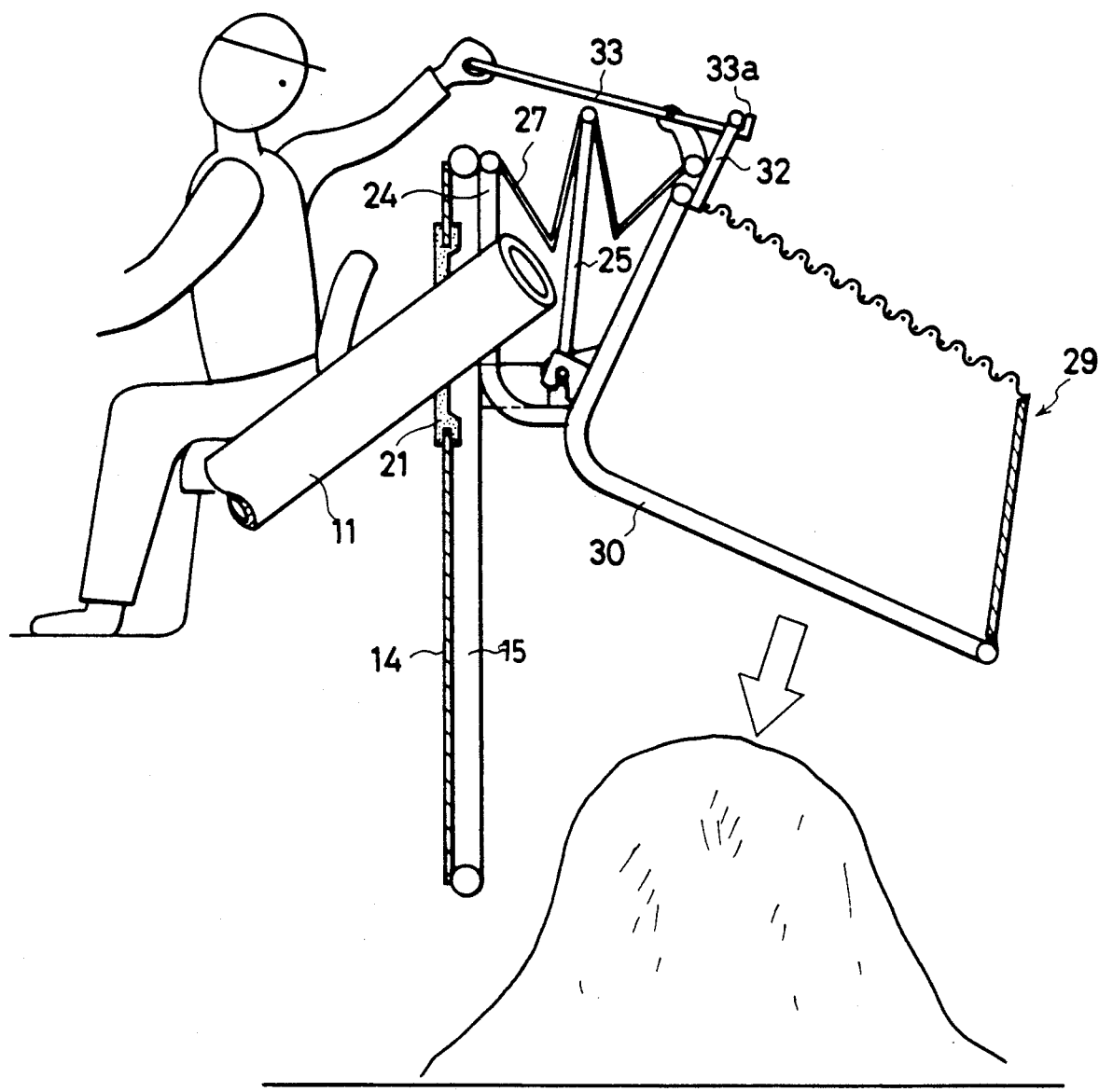

A U-shaped connector 32 protrudes at the rear center of the frame 30 of the mowed grass containing unit 29 to connect the bent portions 33a, 33a of both side lower ends of a handle 33 pivotally secured to the lower gate-shaped frame 26 of the upper cover. The handle 33 is always so biased at its lower end rearwardly by a spring 34 as to maintain a connecting state. The handle 33 is disposed at a position to be easily contacted by a driver's hand in the state that the driver sits on a driver's seat 35 and so formed as to be simultaneously connected to the connectors 32, 32 of the mowed grass containing units 29, 29 aligned at the right and left sides of the back face of the shielding plate 16. Accordingly, the driver can hold the handle 33 while sitting on the driver's seat to connect the bend portions 33a, 33a of the lower end of the handle 33 to the connectors 32, 32 and when he then rotates the handle beforehand, the mowed grass containing units 29, 29 can be rotated with the open portion of the front faces of the containing units 29, 29 directed downward as shown in FIG. 7. Therefore, the mowed grasses in the mowed grass containing units 29, 29 are easily, rapidly and securely discharged. When the mowed grasses are once discharged completely, if the handle 33 is rotated to the original position, the containing units 29, 92 are rotated vertically at the open portion of the front face when they are directed downwardly at the pivotal pins 29, 29 as centers to be brought into pressure contact with the back face of the shielding plate 16, thereby preparing next mowed grass recovery.

Reference numeral 34 denotes a holder piece, which protrudes from the center of the upper gate-shaped frame 24 of the upper cover. The upper gate-shaped frame 24 is longitudinally rotated by holding the holder piece 34.

Figure 5:
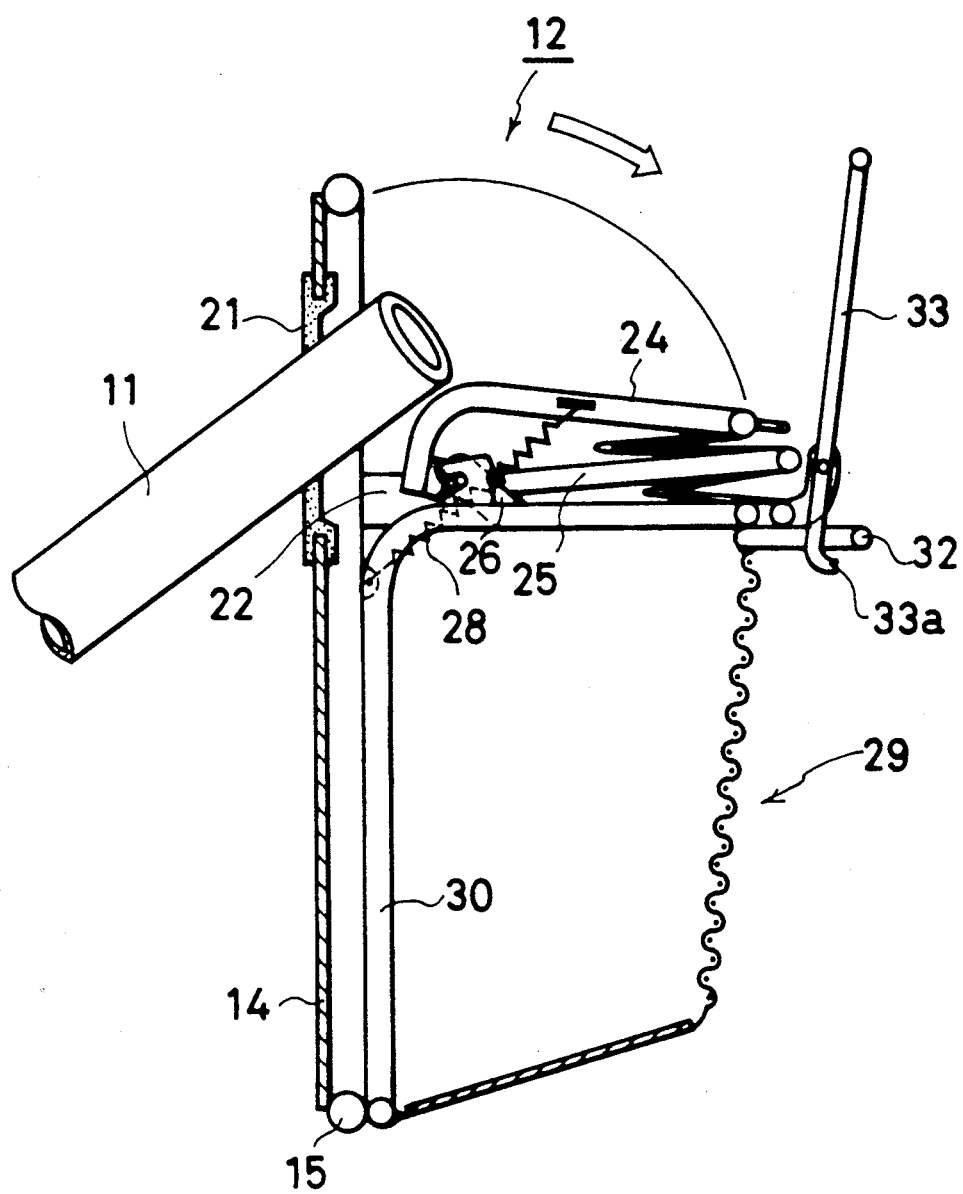
Figure 6:
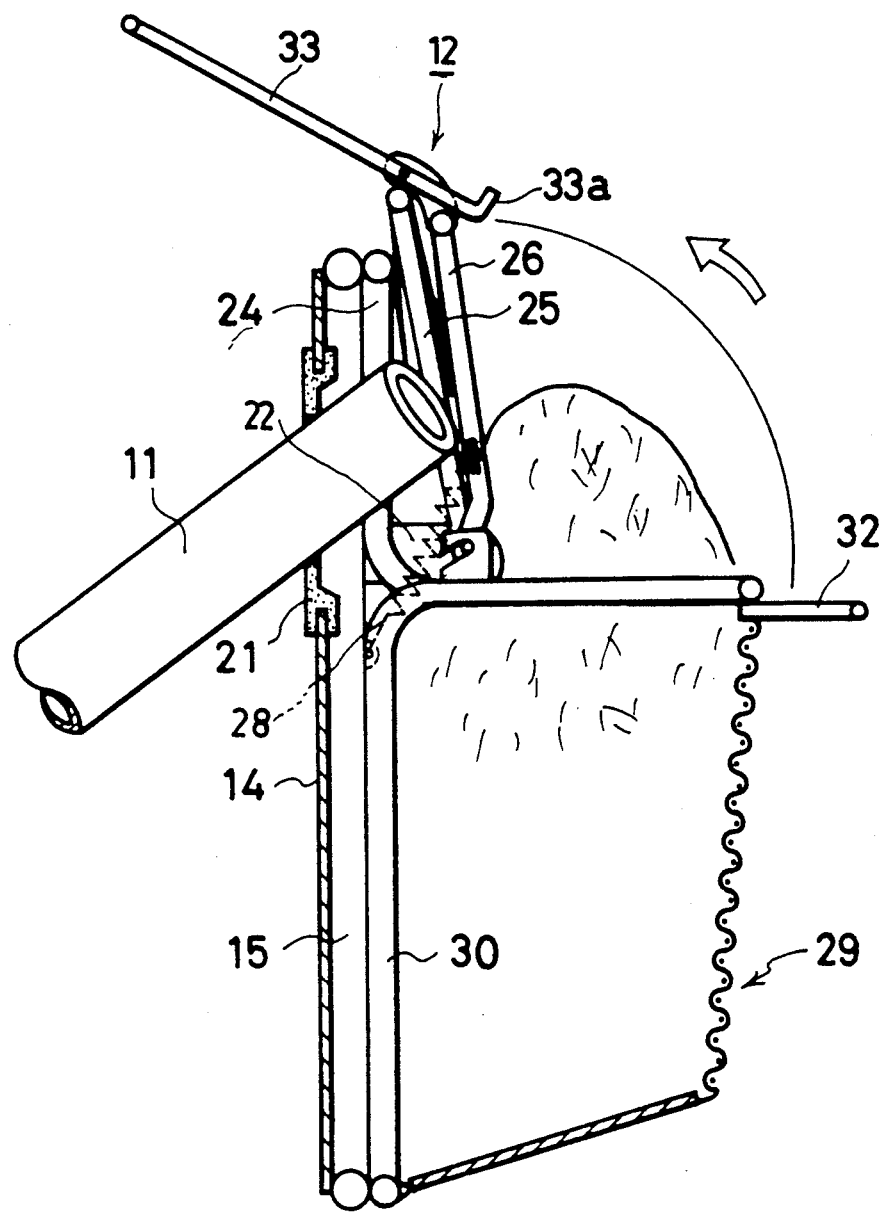

As described above, the upper cover is opened while rotating rearwardly in response to the rotation of the upper and lower gate-shaped frames 24, 26 longitudinally, or the upper gate-shaped frame 24 is rotated to the shielding plate 16, the lower gate-shaped frame 26 is rotated horizontally to be fixed over the fulcra by the springs 28, 28 to thereby block the upper faces of the lower mowed grass containing units 29, 29. Of course, as shown in FIGS. 5 and 6, even when the upper cover is opened, the upper and lower gate-shaped frames 24, 26 are fixed to the shielding plate 16 side or horizontally in the state to be superposed together with the intermediate gate-shaped frame 25 over the fulcra by the springs 28, 28 to maintain the open state. This can be utilized to inspect the recovering state of the mowed grass in the mowed grass containing units 29, 29 or as the cleaning movable mowed grass collecting box.

As shown in FIG. 6, the bent portions 33a, 33a of the lower end of the handle 33 are disengaged from the connectors 32, 32, the handle 33 is then held by hands, and pulled beforehand. Then, the upper cover is simultaneously moved to the shielding plate 16 side to the upper faces of the containing units 29, 29.

Figure 14:
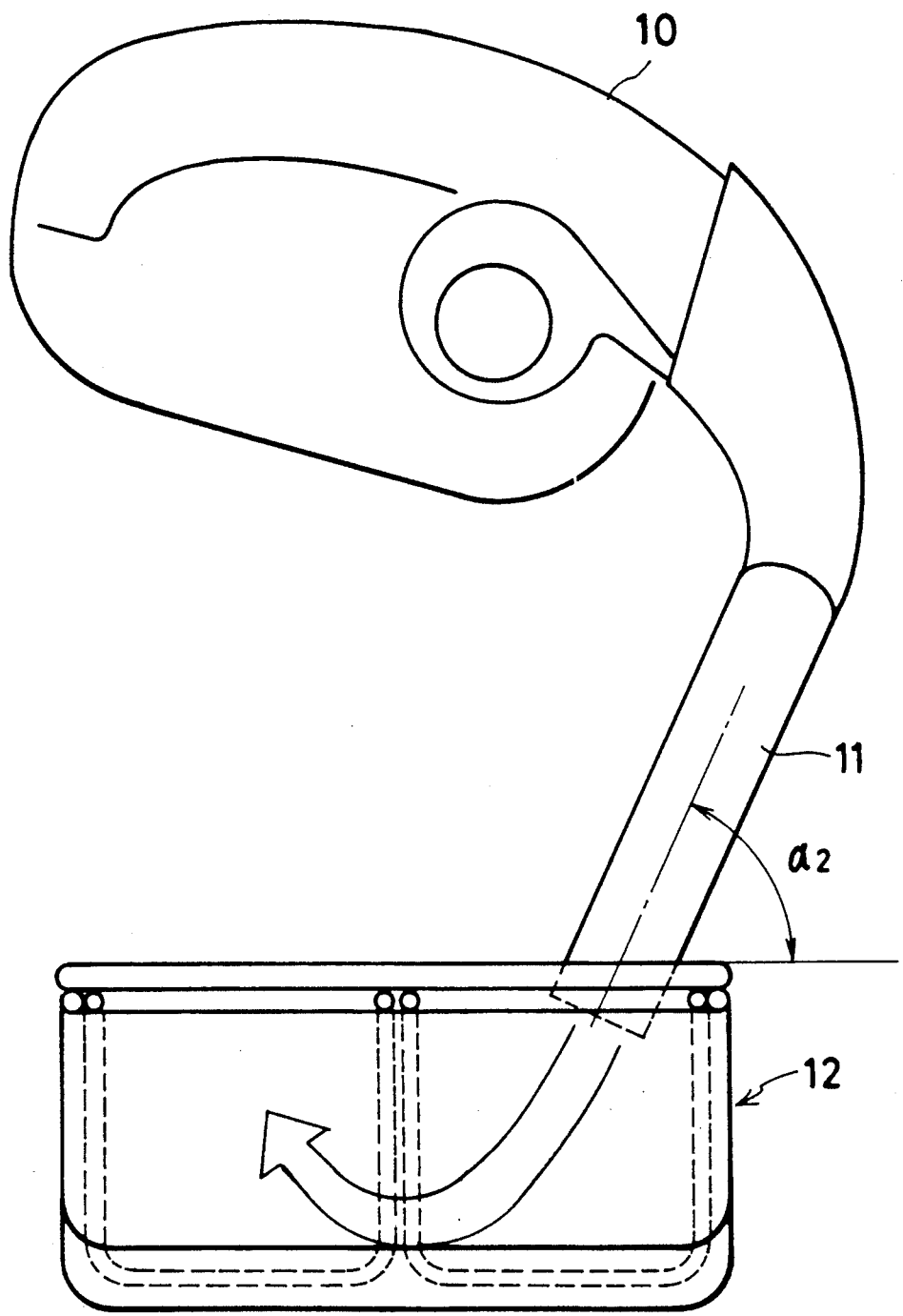
FIG. 14 is a plan view showing the state that a mowed grass discharging cylinder is inserted into the mowed grass container.
Figure 15:
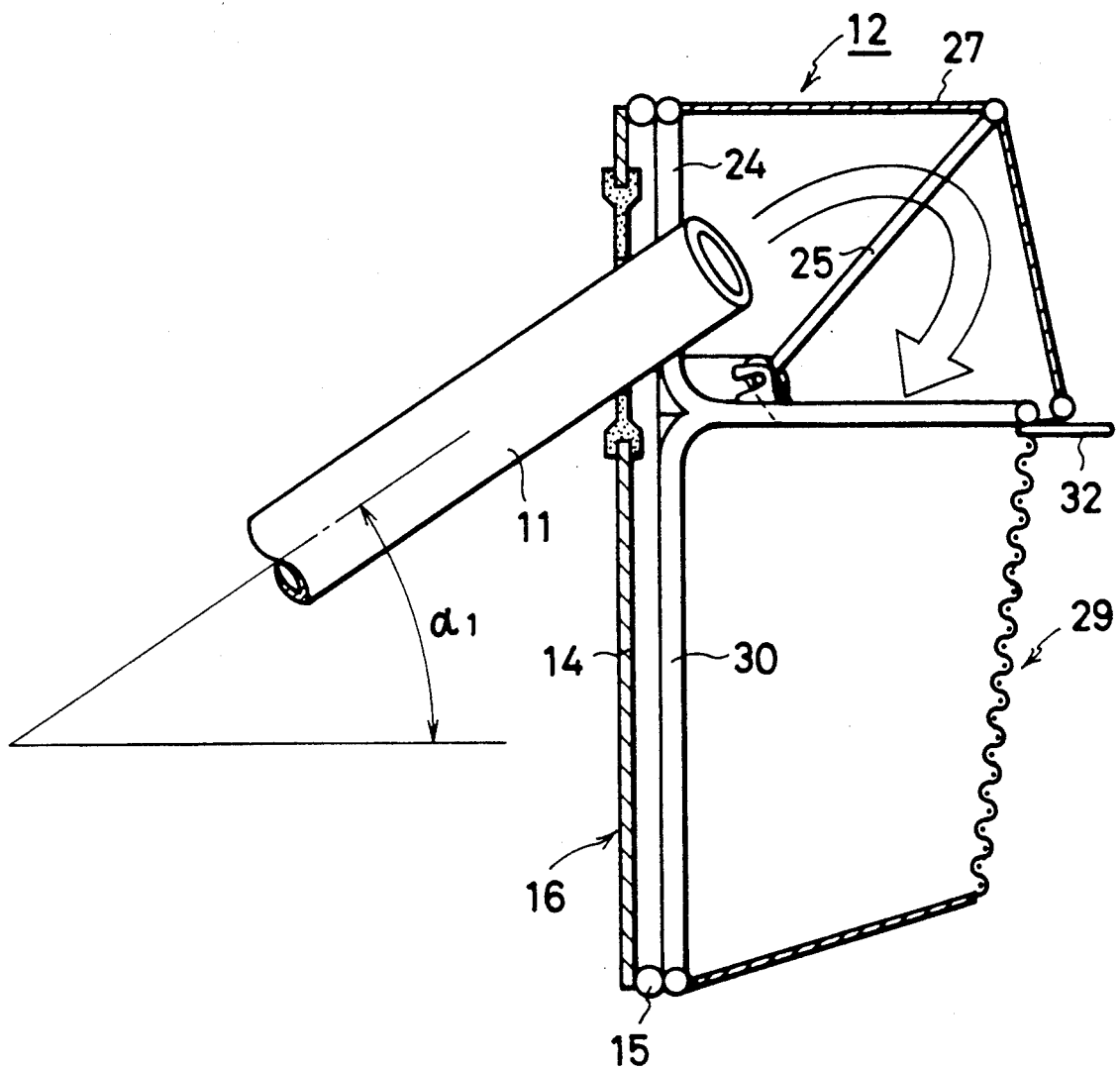
FIG. 15 is a longitudinal side view of FIG. 14.

As shown in FIGS. 14 and 15, when the mowed grass discharge cylinder 11 is set at an inserting angle $\alpha_1$, $\alpha_2$ with respect to the mowed grass container, the mowed grass is dropped while bringing in contact with the ceiling face in the upper cover 27. Thus, the mowed grass is sequentially accumulated from the remote side from the mowed grass discharge cylinder 11, and since the end of the discharge cylinder 11 is not bent as in the conventional one, the mowed grass to be recovered is not stalled, and not clogged in the discharge cylinder 11.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

According to the present invention as described above, the grass mowed by the mowing machine is contained in the mowed grass containing unit of the mowed grass container through feeding means. When the contained mowed grass is filled fully in the containing unit and to be discharged, the holding member is held, connected to the connector formed at the containing unit and rotated. Then, the open portion of the mowed grass containing unit at the shielding plate side is rotated downwardly to discharge the mowed grass contained therein. Since only the upper cover is opened and closed, the mowed grass containing state of the mowed grass containing unit can be inspected, or when the upper cover is opened to the shielding plate side to disconnect the lower mowed grass containing unit from the pivotal pin to be removed and to then carried to an arbitrary disposal place by holding it by hands thereby to abandon the mowed grass.

More specifically, the upper cover is opened at the shielding plate side and the lower face and the shielding side is brought into pressure contact with the shielding plate to be blocked at the time of recovering the mowed grass. Accordingly, the mowed grass can be always fed under pressure into the lower mowed grass containing unit. Further, the lower mowed grass containing unit is opened at its upper face and shielding side, and the open portion of the shielding side is blocked by the shielding plate at the time of recovering the mowed grass. Therefore, the mowed grass recovering operation can be easily performed without fail, and the mowed grass discharging operation can be smoothly conducted as described above. In addition, the upper cover can be used together with the mowing machine body or the rotation of the gate-shaped frames or further by the holding member to further improve the mowed grass discharging operation to shorten the time and improve the operability.

What is claimed is:

1. A mowed grass container for a mowing machine having a mower attached to a machine body through the hanging link mechanism for recovering mowed grass mowed by said mower to the mowed grass container attached to the machine body through conveying means comprising a shielding plate having a side face coupled to the machine body, and upper cover aligned in parallel above and below said side face of said shielding plate, and a lower mowed grass containing unit, said lower mowed grass containing unit being opened at the upper face thereof and at the side face adjacent said shielding side face; a pivot, said grass containing unit being detachable connected to said shielding plate through said pivot provided at position separated from said shielding plate and attached so as to rotate about said pivot as a rotating center whereby said open side face being directed downwardly.

2. The mowed grass container for a mowing machine according to claim 1, wherein said upper cover is foldable between opened and closed position between the face of said shielding plate side and upper face of said grass containing unit.

3. The mowed grass container for a mowing machine according to claim 1, wherein said upper cover includes a gate-shaped frame pivotally secured and longitudinally rotatable about said pivot.

4. The mowed container for a mowing machine according to claim 1, wherein said upper cover comprises a foldable bellows.

5. The mowed grass container for a mowing machine according to claim 1, wherein a connector is provided at the upper frame of said mowed grass containing unit, and a holding member pivotally secured to an upper cover frame is connected to said connector.

6. The mowed grass container for a mowing machine according to claim 1, wherein said holding member comprises a handle for discharging mowed grass in said mowed grass containing unit and disposed at a distance to be contacted by a driver's hand.

7. The mowed grass container for a mowing machine according to claim 1, wherein said grass container includes a frame comprising opposed longitudinal frame portions and an interconnection cross member interconnecting said longitudinal frame portion adjacent the lower ends thereof; and a U-shaped cross member interconnected between the upper ends of said opposed longitudinal frame portions, and opposed side faces and back face connected to said frame defining a container having open front and upper faces.

8. A mowed grass container for a mowing machine having a mower attached to a machine body associated with a conveying means for conveying the mowed grass comprising a mounting shield adapted to be attached to the machine body, a foldable cover hingedly connected to said mounting shield, a grass containing unit pivotally supported on said mounting shield, said grass containing unit having an open front and an open upper end, said cover forming a closure for said upper end, said open front of said grass containing unit being normally biased toward said mounting shield, whereby said grass containing unit receives the mowed grass from the conveying means, and whereby pivoting of said grass containing unit relative to said mounting shield causes the mowed grass collected therein to be discharged through said front opening.

* * * * *